H. C. MICHEL.
DRAFT DEVICE.
APPLICATION FILED NOV. 10, 1915.
1,194,763.
Patented Aug. 15, 1916.
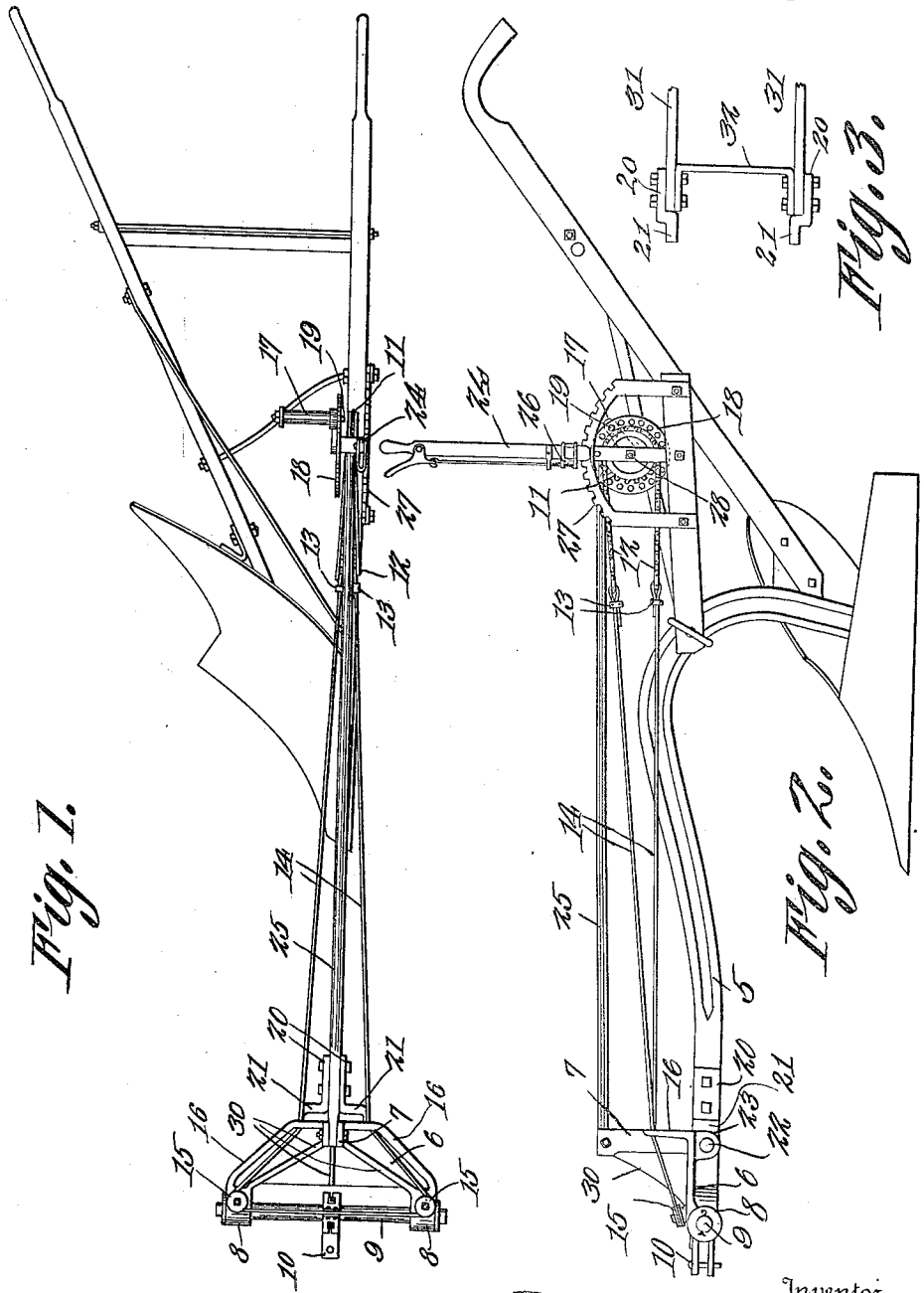

UNITED STATES PATENT OFFICE.

HERMAN C. MICHEL, OF DIXIE, WASHINGTON.

DRAFT DEVICE.

1,194,763. Specification of Letters Patent. Patented Aug. 15, 1916.

Application filed November 10, 1915. Serial No. 60,677.

*To all whom it may concern:*

Be it known that I, HERMAN C. MICHEL, a citizen of the United States, residing at Dixie, in the county of Walla Walla and State of Washington, have invented certain new and useful Improvements in Draft Devices, of which the following is a specification.

This invention relates to draft devices, and more particularly the supporting means thereof, the object of the present invention being to provide a novel and improved support which is laterally and vertically adjustable, so that the line of draft may be shifted laterally and also raised or lowered.

The object stated is attained by means of a combination and arrangement of parts to be hereinafter described and claimed, and in order that the same may be better understood, reference is had to the accompanying drawing, in which—

Figure 1 is a plan view showing the application of the invention; Fig. 2 is a side elevation thereof, and Fig. 3 is a detail showing a modification.

Referring specifically to the drawing, 5 denotes the beam of a plow to which the invention is applied. It is to be understood, however, that the invention is not limited to plows, but may, with equal facility, be applied to other agricultural implements or machinery requiring an adjustable draft device.

To the front end of the beam 5 is applied a supporting member 6 having at its rear end an upright post 7, and at its forward end laterally spaced bearings 8 between which latter extends and in which is supported a stationary horizontal shaft 9 extending transversely of the plow beam. On the shaft 9 is slidably mounted a clevis 10 to which the draft animals are hitched as usual. As the clevis is slidable, it may be moved laterally from the center to put the draft on either side, which is desirable when working on a side hill.

Lateral adjustment of the clevis 10 is effected by the following means: On the rear end of the plow beam 5 is mounted a sprocket wheel 11 over which passes a short chain 12. To the respective ends of the sprocket chain are fastened, by suitable clips 13, two hauling lines 14, which latter extend forward and are connected, respectively, to opposite sides of the clevis 10. The opposite sides of the member 6 carry guide pulleys 15 for the hauling lines, and the latter also pass through guide apertures in strengthening webs 16 extending between the member 6 and the post 7. The sprocket wheel 11 is operated by a crank handle 17, a suitable means being provided for locking the same, such means being an apertured keeper plate 18 for a latch pin 19 carried by the crank handle. The clevis 10 is also adjustable vertically, which is effected by providing a pivotal support for the member 6. To the outer end of the plow beam 5, on opposite sides thereof, are rigidly secured hinge plates 20 having outward offsets 21 at their forward ends, said offsets carrying a hinge pin 22 by which the member 6 is hinged, the rear portion thereof having a bottom hinge knuckle 23 through which the pin 22 passes. The hinge connection is such that the member 6 is free to swing in a vertical plane, thereby raising or lowering the clevis 10.

The following means are provided for swinging the member 6 to effect the vertical adjustment of the clevis 10: On the rear end of the plow beam 5 is mounted a hand lever 24 which is connected by a rod 25 to the upper end of the post 7. Thus, it will be seen that when the hand lever is swung, the member 6 is swung to raise or lower the clevis 10 for the purpose stated. The hand lever 24 has the usual spring latch 26 engageable with a toothed sector 27 to lock the hand lever. The hand lever 24 carries the shaft 28 of the sprocket wheel 11, and also the plate 18. It will therefore be seen that the means whereby the lateral adjustment of the clevis 10 is effected swing with the lever, so that this adjustment will not be disturbed when the lever is operated to effect the vertical adjustment of the clevis, the spacing of the connections being such that the member 6 may be swung without breaking the lines 14. The member 6 and the post 7 may be a casting braced by the webs 16 and webs 30, but the parts may also be made of wrought iron.

Fig. 3 shows how the hinge plates 20 may be attached to a gang plow for the application of the invention thereto, said plates being connected to the two beams 31, with the offsets 21 on the inside. The beams are connected by a cross brace 32.

I claim:

1. A draft device comprising a clevis, a transverse shaft on which the clevis is slidably mounted, a vertically swinging support for the shaft, a lever having a connection with the support for swinging the same, means for shifting the clevis on the shaft, and an actuating means for said shifting means carried by the lever.

2. A draft device comprising a clevis, a transverse shaft on which the clevis is slidably mounted, a vertically swinging support for the shaft, a lever having a connection with the support for swinging the same, a hauling line connected to opposite sides of the clevis, and a rotatable operating member for the line carried by the lever, to which member the hauling line is connected.

3. A draft device comprising a clevis, a transverse shaft on which the clevis is slidably mounted, a vertically swinging support for the shaft, a lever having a connection with the support for swinging the same, a hauling line connected to opposite sides of the clevis, guides on the support for the hauling line, and a rotatable operating member for the line carried by the lever, to which member the hauling line is connected.

4. A draft device comprising a clevis, a transverse shaft on which the clevis is slidably mounted, a vertically swinging support for the shaft, said support having a post, a lever having a connection with the post for swinging the support, means for shifting the clevis on the shaft, and an actuating means for said shifting means carried by the lever.

In testimony whereof I affix my signature in the presence of two witnesses.

HERMAN C. MICHEL.

Witnesses:
 E. D. MATTINSON,
 E. E. SAUZE.

Copies of this patent may be obtained for five cents each, by addressing the "Commissioner of Patents, Washington, D. C."